US008989750B2

(12) United States Patent
Mochizuki

(10) Patent No.: US 8,989,750 B2
(45) Date of Patent: Mar. 24, 2015

(54) CONTROL CIRCUIT, IMPEDANCE ADJUSTING CIRCUIT, IMPEDANCE AUTOMATIC ADJUSTING CIRCUIT, RADIO TRANSCEIVER CIRCUIT, CONTROL METHOD, IMPEDANCE ADJUSTING METHOD, IMPEDANCE AUTOMATIC ADJUSTING METHOD, AND RADIO TRANSCEIVING METHOD

(71) Applicant: Yokogawa Electric Corporation, Mushashino-shi, Tokyo (JP)

(72) Inventor: Satoshi Mochizuki, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 161 days.

(21) Appl. No.: 13/759,350

(22) Filed: Feb. 5, 2013

(65) Prior Publication Data

US 2013/0203362 A1 Aug. 8, 2013

(30) Foreign Application Priority Data

Feb. 6, 2012 (JP) ................................ 2012-023254

(51) Int. Cl.

*H04W 40/00* (2009.01)
*H01Q 15/02* (2006.01)
*H01P 1/20* (2006.01)
*H01Q 15/00* (2006.01)

(52) U.S. Cl.

CPC .................. *H01Q 15/02* (2013.01); *H01P 1/20* (2013.01); *H01Q 15/0086* (2013.01)
USPC ............................................ 455/446; 455/73

(58) Field of Classification Search

CPC .................................................... H04W 16/24
USPC .................................................... 455/446, 73
See application file for complete search history.

(56) References Cited

U.S. PATENT DOCUMENTS

2007/0087738 A1* 4/2007 Melkesetian .............. 455/422.1
2009/0174609 A1 7/2009 Sanada
2009/0262766 A1 10/2009 Chen et al.

(Continued)

FOREIGN PATENT DOCUMENTS

JP 2003209266 A 7/2003
JP 2008-54146 A 3/2008
WO 2011152055 A1 12/2011

OTHER PUBLICATIONS

Extended European Search Report, dated Apr. 11, 2014, issued by the European Patent Office in counterpart European Application No. 13154067.6.

(Continued)

*Primary Examiner* — April G Gonzales
(74) *Attorney, Agent, or Firm* — Sughrue Mion, PLLC

(57) ABSTRACT

There is provided a control circuit (1) including: a cell area (2A) comprising a plurality of cells (2) arranged therein, each of the cells including: a first conductor (3) having at least one capacitance component (C1, C2); a second conductor (4) connected to the first conductor and having an inductance component; and a feed line (5) provided to be in non-contact with the first conductor and the second conductor, wherein a size of each of the cells is smaller than a wavelength of a signal to be influenced by the cells; and at least one feed controller (6) configured to control at least one of permittivity and permeability of the cell area by changing the amount of a power supply provided to the feed line of each of the cells.

18 Claims, 10 Drawing Sheets

(56) References Cited

U.S. PATENT DOCUMENTS

| | | | | |
|---|---|---|---|---|
| 2010/0040026 | A1* | 2/2010 | Melkesetian | 370/332 |
| 2012/0026067 | A1* | 2/2012 | Parsche | 343/904 |
| 2013/0038504 | A1* | 2/2013 | Livingston | 343/872 |
| 2013/0069848 | A1 | 3/2013 | Toyao et al. | |

OTHER PUBLICATIONS

Hand, Thomas H., et al. "Controllable Magnetic Metamaterial Using Digitally Addressable Split-Ring Resonators," IEEE Antennas and Wireless Propagation Letters, vol. 8, Jan. 1, 2009, pp. 262-265.

* cited by examiner

CONTROL CIRCUIT, IMPEDANCE ADJUSTING CIRCUIT, IMPEDANCE AUTOMATIC ADJUSTING CIRCUIT, RADIO TRANSCEIVER CIRCUIT, CONTROL METHOD, IMPEDANCE ADJUSTING METHOD, IMPEDANCE AUTOMATIC ADJUSTING METHOD, AND RADIO TRANSCEIVING METHOD

CROSS-REFERENCE TO RELATED APPLICATION

This application claims priority from Japanese Patent Applications No. 2012-023254, filed on Feb. 6, 2012, the entire contents of which are herein incorporated by reference.

BACKGROUND

1. Technical Field

The present invention relates to a control circuit and a control method which can control at least one of permittivity and permeability. The invention also relates to an impedance adjusting circuit, an impedance automatic adjusting circuit, a radio transceiver circuit, a control method, an impedance adjusting method, an impedance automatic adjusting method, and a radio transceiving method.

2. Related Art

Permittivity and permeability have prescribed physical influences on signals such as an electric signal which flows through a signal path of an electric circuit and a radio signal for radio transmission or reception. For example, permittivity and permeability influence an electric signal in such a manner as to change its amplitude, phase, delay, or the like. For another example, a characteristic of an electric circuit can be controlled by controlling permittivity. In this connection, JP-A-2003-209266 discloses a technique for varying the capacitance of a capacitance component by controlling permittivity.

As described above, permittivity and permeability have prescribed physical influences on an electric signal and a radio signal and change their amplitudes, phases, delays, or the like. That is, if permittivity or permeability can be controlled in a desired manner, a desired influence can be given to a signal such as an electric signal or a radio signal.

In the technique of JP-A-2003-209266, to control the permittivity of a dielectric crystal in a desired manner, it is necessary to not only apply, to the dielectric crystal, light whose energy is equal to the band gap energy of the dielectric crystal but also apply an electric field to the dielectric crystal. This requires a complex configuration and control.

SUMMARY OF THE INVENTION

One or more illustrative aspects of the present invention are to give a signal a desired influence by controlling permittivity or permeability by a simple control.

According to one or more illustrative aspects of the present invention, there is provided a control circuit (1) comprising: a cell area (2A) comprising a plurality of cells (2) arranged therein, each of the cells comprising: a first conductor (3) having at least one capacitance component (C1, C2); a second conductor (4) connected to the first conductor and having an inductance component; and a feed line (5) provided to be in non-contact with the first conductor and the second conductor, wherein a size of each of the cells is smaller than a wavelength of a signal to be influenced by the cells; and at least one feed controller (6) configured to control at least one of permittivity and permeability of the cell area by changing the amount of a power supply provided to the feed line of each of the cells.

According to one or more illustrative aspects of the present invention, the second conductor is formed as a via conductor which is short-circuited to a common potential for the respective cells, and the feed line is in non-contact with the via conductor.

According to one or more illustrative aspects of the present invention, the first conductor is formed in an approximately 8-shape having at least one air gap.

According to one or more illustrative aspects of the present invention, there is provided an impedance adjusting circuit (12, 13, 36) comprising: the control circuit (1); and a signal line (15,16) which is in non-contact with the cell area, wherein the control circuit is configured to control the permittivity of the cell area so as to obtain a desired characteristic impedance of a signal transmitted through the signal line.

According to one or more illustrative aspects of the present invention, there is provided an impedance automatic adjusting circuit (30) comprising: the impedance adjusting circuit (36); a detector (39) configured to detect, for different power supply values, a level of the signal that is output from the impedance adjusting circuit; and a power supply value setting unit (43) configured to set a power supply value corresponding to a desired level of the signal in the feed controller (6).

According to one or more illustrative aspects of the present invention, the impedance automatic adjusting circuit further comprises: a storage unit (44) configured to store power supply values and levels of the signal detected by the detector such that each of the power supply values is associated with a corresponding one of the levels of the signal. The power supply value setting unit (43) is configured to set, in the feed controller (6), the power supply value corresponding to the desired level of the signal, which is stored in the storage unit.

According to one or more illustrative aspects of the present invention, the impedance automatic adjusting circuit further comprises: a level controller (40, 41, 42) configured to control the power supply value such that the level of the signal detected by the detector is coincident with the level of the signal corresponding to the power supply value set by the power supply value setting unit.

According to one or more illustrative aspects of the present invention, there is provided a radio transceiver circuit (51). The radio transceiver circuit (51) comprises: the control circuit (1); and an antenna (53) configured to transmit and receive a radio signal having a certain frequency, wherein the cell area (2A) of the control circuit is provided around the antenna, and wherein the feed controller (6) controls the permittivity of the cell area such that the radio signal having the certain frequency is allowed to pass through the cell area and radio signals having frequencies other than the certain frequency are reflected by the cell area.

According to one or more illustrative aspects of the present invention, the control circuit (1) comprises first and second control circuits, and a cell area (2A) of the first control circuit is formed on a first layer, a cell area (2A) of the second control circuit is formed on a second layer, and the antenna (53) is formed on a third layer which is located between the first and second layers.

According to one or more illustrative aspects of the present invention, the radio transceiver circuit further comprises: a power supply value setting unit (71) configured to measure a reception level of the radio signal having the certain frequency, which is received by the antenna, and to set a power supply value corresponding to the measured reception level of the radio signal in the feed controller.

According to one or more illustrative aspects of the present invention, if a first power supply value corresponding to a first reception level of the radio signal having the certain frequency is set in the feed controller in advance, the power supply value setting unit: i) measure a second reception level of the radio signal having the certain frequency, which corresponds to a second power supply value, wherein the second power supply value is larger than the first power supply value; ii) set the second power supply value in the feed controller, if the second reception level corresponding to the second power supply value is larger than the first reception level corresponding to the first power supply value; and iii) set the first power supply value in the feed controller, if the second reception level corresponding to the second power supply value is smaller than the first reception level corresponding to the first power supply value.

According to one or more illustrative aspects of the present invention, the control circuit is integrated in one chip.

According to one or more illustrative aspects of the present invention, there is provided a control method of controlling at least one of permittivity and permeability of a cell area (2A) comprising a plurality of cells (2) arranged therein, each of the cells comprising: a first conductor (3) having at least one capacitance component (C1, C2), a second conductor (4) connected to the first conductor and having an inductance component; and a feed line (5) provided to be in non-contact with the first conductor and the second conductor, wherein a size of each of the cells is smaller than a wavelength of a signal to be influenced by the cells. The control method comprises: controlling at least one of permittivity and permeability of the cell area by changing the amount of a power supply provided to the feed line of each of the cells.

According to one or more illustrative aspects of the present invention, there is provided an impedance adjusting method using the control method, comprising: controlling the permittivity of the cell area so as to obtain a desired characteristic impedance of a signal transmitted through a signal line which is in non-contact with the cell area.

According to one or more illustrative aspects of the present invention, there is provided an impedance automatic adjusting method using the impedance adjusting method, comprising: detecting a level of the signal for different power supply values; and setting a power supply value corresponding to a desired level of the signal, when the detected level of the signal reaches the desired level.

According to one or more illustrative aspects of the present invention, the impedance automatic adjusting method further comprises: controlling the power supply value such that the detected level of the signal is coincident with the level of the signal corresponding to the set power supply value.

According to one or more illustrative aspects of the present invention, there is provided a radio transceiving method of transceiving a radio signal having a certain frequency with an antenna (53) by using the control method, wherein the antenna (53) is configured to transmit and receive a radio signal having a certain frequency, and the cell area (2A) is provided around the antenna. The method comprises: controlling the permittivity of the cell area such that the radio signal having the certain frequency is allowed to pass through the cell area and radio signals having frequencies other than the certain frequency are reflected by the cell area; and transceiving the radio signal having the certain frequency with the antenna.

According to one or more illustrative aspects of the present invention, the radio transceiving method further comprises: measuring a reception level of the radio signal having the certain frequency, which is received by the antenna; and setting a power supply value corresponding to the measured reception level.

According to the present invention, the permittivity or permeability of the cell area and its neighboring space is controlled by controlling the amounts of power supplied to the respective feed lines. The control of the permittivity or permeability makes it possible to give a desired influence on a signal.

DETAILED DESCRIPTION OF EXEMPLARY EMBODIMENTS

Figure 1:
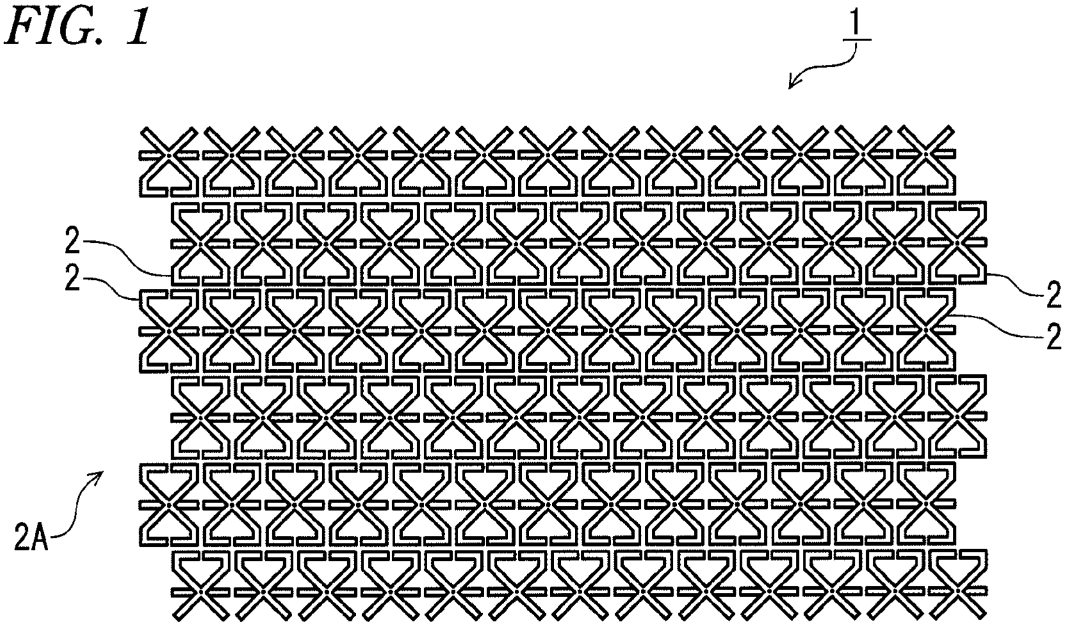
FIG. 1 shows a cell area of a control circuit according to an embodiment.

An embodiment of the present invention will be hereinafter described. FIG. 1 shows a control circuit 1 according to the embodiment. As shown in FIG. 1, the control circuit 1 is configured such that a large number of cells 2 are arranged two-dimensionally (i.e., in the vertical and horizontal directions) on a substrate (not shown). Alternatively, cells 2 may be arranged one-dimensionally or three-dimensionally. In the embodiment, an area where the cells 2 are arranged two-dimensionally is called a cell area 2A and the control circuit 1 is mainly formed by the cell area 2A.

The cell area 2A can function as a CRLH (composite right and left handed) structure. CRLH structures are composite structures of a right-handed (RH) system structure in which permittivity and permeability have positive values and a left-handed (LH) system structure in which permittivity and permeability have negative values. Whereas right-handed systems structures behave like natural substances, left-handed system structures behave in manners that are not found in nature. Thus, left-handed system structures are composed of artificial substances. Left-handed system structures are called metamaterials.

Figure 2:
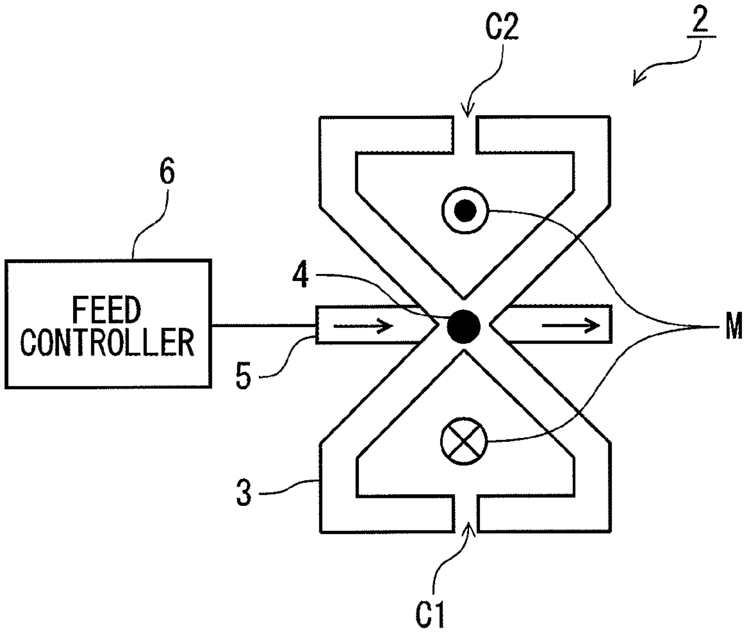
FIG. 2 shows the structure of each cell used in the embodiment.

Each cell 2 has a structure shown in FIG. 2 and is extremely small in size. The control circuit 1 is a circuit that is constructed to give a prescribed influence on an electric signal flowing in an electric circuit or a radio signal (hereinafter referred to simple as a signal). The size of each cell 2 should be at least smaller than the wavelength λ of a signal. It is even preferable that the size of each cell 2 be sufficiently smaller than (e.g., ⅛ of) the wavelength λ, of a signal.

Each cell 2 is composed of a first conductor 3, a second conductor 4, and a feed line 5. The first conductor 3 is provided so that a surface current flows through it and is made of a conductive substance. The first conductor 3 includes at least one capacitance. To satisfy this condition, the first conductor 3 is approximately shaped like a numeral "8" and has two gaps C1 and C2 at the top and the bottom, respectively. Capacitances are formed by the respective gaps C1 and C2.

It suffices that the first conductor 3 be made of a conductive substance and include at least one capacitance; the first conductor 3 may have an arbitrary shape such as an approximately rectangular shape, an approximately triangular shape, or a prescribed planar shape. Whatever shape the first conductor 3 has, it should include at least one capacitance. The position of the at least one capacitance is not restricted as long as it is formed at a certain position in the first conductor 3. Example dimensions representing the size of each cell 2 are the lengths of its respective sides (e.g., the vertical and horizontal lengths of the first conductor 3 across the plane and the longitudinal length of the feed line 5 in each cell 2).

The second conductor 4 is formed as a via (through-hole) conductor so as to extend in the direction that is perpendicular to the paper surface of FIG. 2. Although in FIG. 2 the second conductor 4 is formed at the intersection of the two diagonal elements of the approximately 8-shaped first conductor 3, the second conductor 4 may be formed at an arbitrary position in the first conductor 3. The second conductor 4 is short-circuited to a common potential (e.g., ground layer GND (described later)) to become a short stub. As a result, the second conductor 4 has an inductance. The second conductor 4 may be a conductor other than a via conductor as long as it has an inductance.

The feed line 5 is a current flowing line. The feed line 5 is placed at a different height position than the first conductor 3 in the direction that is perpendicular to the paper surface of FIG. 2. As a result, the first conductor 3 and the feed line 5 are not in contact with each other. The feed line 5 is not in contact with the second conductor 4 either. To this end, the feed line 5 has a through-hole which is larger in diameter than the second conductor 4 and the second conductor 4 is inserted through this through-hole so as not be in contact with the feed line 5.

A feed controller 6 is connected to the feed line 5. The feed controller 6 not only serves as a current source for supplying power to the feed line 5 to cause a current to flow through it, but also can control the supply power (current) to a proper value. Although in FIG. 2 the feed controller 6 is connected to the feed line 5 to supply power to it (contact power supply), a non-contact power supply method may be employed.

Feed controllers 6 may be provided so as to supply power to all of the large number of cells 2 individually. Alternatively, a single feed controller 6 may supply power to a prescribed number of cells 2 of all of the large number of cells 2. For example, a single feed controller 6 may supply power to the feed lines 5 of plural cells that are arranged in one row. An arbitrary power supply method may be employed such as power supply by radiation of radio waves. As a further alternative, a single feed controller 6 may supply power to all the cells 2.

Therefore, depending on the manner of power supply to the cells 2, feed controllers 6 may be provided in either the same number as or a smaller number than the cells. That is, at least one feed controller 6 is provided.

When the feed line 5 is supplied with power, a current flows through it (the current may be either a high-frequency current or a low-frequency current). As a result, as shown in FIG. 2, a magnetic field M is generated, as a result of which a surface current flows through the first conductor 3. The magnitude of the surface current is proportional to the amount of power supplied to (i.e., the current flowing through) the feed line 5.

Since the surface current flows through the first conductor 3, charge is accumulated in the capacitances C1 and C2 and a current flows through the second conductor 4. In this manner, an LC resonance circuit is formed which has a prescribed resonance frequency which depends on the amount of power supplied to the feed line 5. Since each cell 2 constitutes an LC resonance circuit, an arrangement of a large number of LC resonance circuits is formed by arranging the large number of cells 2 in the vertical and horizontal directions.

The cells 2 are arranged such that adjoining ones are close to each other and are not in contact with each other. As a result, a stray capacitance is generated between each cell 2 and the cells 2 around it. This stray capacitance constitutes part of the capacitance of the LC resonance circuit. Since the stray capacitance depends on the surface current flowing through the first conductor 3, it is proportional to the amount of power supplied to the feed line 5.

The cell area 2A having a prescribed area is formed by arranging the large number of minute cells 2 which are sufficiently smaller than the wavelength $\lambda$ of a signal, two-dimensionally such that they are close to each other and are not in contact with each other. That is, a large number of minute LC resonance circuits are arranged in array in the cell area 2A. This structure can function as a CRLH structure.

The feed controllers 6 supply power to the feed lines 5 of the respective cells 2 of the cell area 2A. As a result, resonance occurs in each LC resonance circuit and the permittivity (and permeability) of the cell area 2A and its neighboring space is determined. The permittivity is varied by varying the amounts of power supplied from the feed controllers 6. That is, the permittivity of the cell area 2A and its neighboring space can be controlled by controlling the supply power.

As described above, the cell area 2A is configured as an arrangement of the large number of cells 2 (LC resonance circuits) and its permittivity can be controlled according to the amount of power supplied to it. Not only the permittivity of the cell area 2A but also its permeability can be controlled by the amount of power supplied to it. Therefore, it is possible to give a signal a prescribed influence (e.g., cause a change in amplitude, phase, delay, or the like) by controlling one or both of the permittivity and permeability of the cell area 2A.

In Examples described below, permeability is controlled according to the amount of supply power, whereby various workings and advantages are obtained. Since as described above permeability can also be controlled by controlling the amount of supply power, the control circuit 1 according to the embodiment can be applied to a circuit in which control is made so as to attain a desired permeability value.

As described above, in the control circuit 1 according to the embodiment, the amount of power supplied to the feed line 5 of each of the cells 2 constituting the cell area 2A is controlled, whereby the permittivity or permeability of the cell area 2A and its neighboring space can be controlled in a desired manner. While a signal passes through the permittivity or permeability-controlled space, the controlled permittivity or permeability influences the signal, that is, varies its amplitude, phase, delay, or the like. In this manner, a desired influence can be given to the signal by controlling the permittivity or permeability.

EXAMPLE 1

Next, a description will be made of Example 1 which is an application example of the above-described control circuit 1.

Figure 3A:
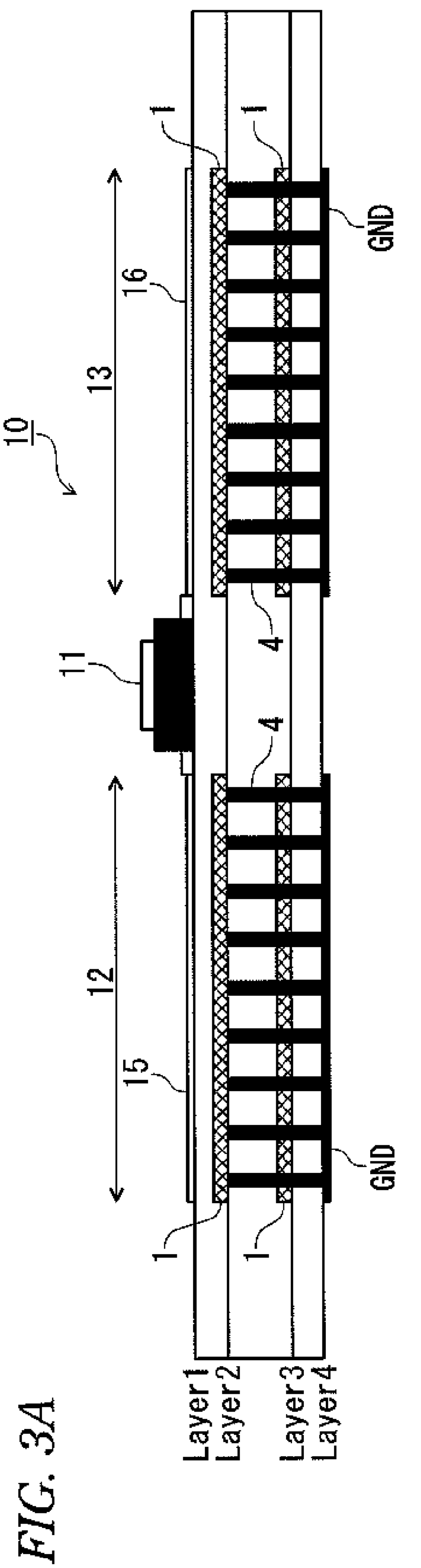
FIGS. 3A and 3B are a side view and a top view, respectively, of a signal input/output circuit of Example 1.
Figure 3B:
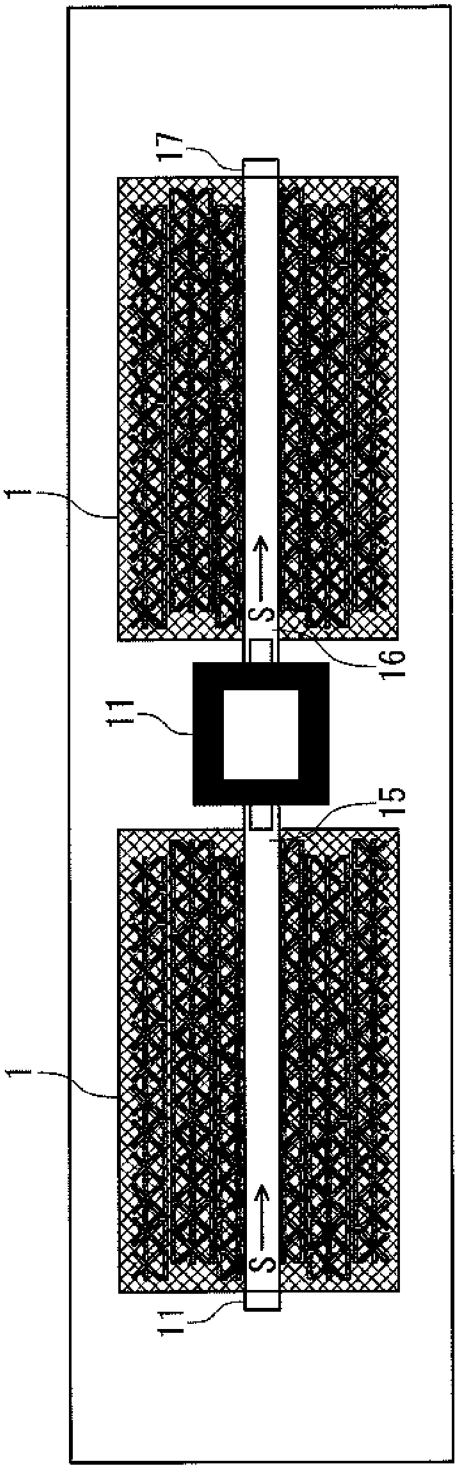

Example 1 is directed to impedance adjusting circuits each of which makes an impedance adjustment, in particular, impedance matching. These impedance adjusting circuits can be applied to any circuit which requires an impedance adjustment. FIGS. 3A and 3B are a side view and a top view, respectively, of a signal input/output circuit 10 to which the impedance adjusting circuit is applied.

As shown in FIGS. 3A and 3B, the signal input/output circuit 10 has a DUT (device under test) 11 which is a circuit that requires impedance matching and an input-side impedance adjusting circuit 12 and an output-side impedance adjusting circuit 13 which are connected to the input side portion and the output side portion of the DUT 11. The DUT 11 is a prescribed circuit which is a non-linear device. The DUT 11 may be an arbitrary circuit such as an FET (field-effect transistor), an RF (radio-frequency) filter, or an RF (radio-frequency) switch.

As shown in FIG. 3A, each of the input-side impedance adjusting circuit 12 and the output-side impedance adjusting circuit 13 has a multi-layered (4-layer) structure. A first layer (Layer1) which is the top layer of the input-side impedance adjusting circuit 12 is a layer in which an input-side signal line 15 is formed. A second layer (Layer2) is a layer in which a control circuit 1 is formed. A third layer (Layer3) is a layer in which another control circuit 1 is formed. A fourth layer (Layer4) which is the bottom layer is a short-circuiting layer, that is, a common potential layer (ground layer GND).

As described in the above embodiment, each cell 2 of the cell area 2A of each control circuit 1 has the second conductor 4. As shown in FIG. 3A, the second conductors 4 which are via conductors are short-circuited by the ground layer GND of the bottom layer. As a result, the second conductors 4 function as an inductance.

The input-side impedance adjusting circuit 12 and the output-side impedance adjusting circuit 13 are impedance adjusting circuits of this Example 1. Although both of the input-side impedance adjusting circuit 12 and the output-side impedance adjusting circuit 13 are provided in FIGS. 3A and 3B, only one of them may be provided. However, using the impedance adjusting circuit of this Example 1 on both of the input side and the output side enables matching of the input impedance and the output impedance.

A signal S is input to and output from the DUT 11. It is necessary to make input and output impedance matching of the DUT 11 for the signal S. This impedance matching prevents power loss of the signal S and thereby enables normal input and output of the signal S. In other words, if this impedance matching were not made, part of the signal S would be reflected to cause a power loss and the signal S would not be input or output normally.

Thus, it is necessary that the DUT 11 be provided with an impedance matching circuit on both of the input side and the output side. Conventionally, such an impedance matching circuit needs to be designed for each frequency band of the signal S using, specifically, an LC circuit or the like. However, designing of such an impedance matching circuit is very difficult and takes time. And designed impedance matching circuits tend to vary in performance to a large extent depending on the skills of designers.

There are other factors that make it difficult to attain desired impedance matching, such as a prepreg and the thickness of a substrate used in an actual impedance matching circuit, a permittivity variation, and the accuracy of etching that is performed in circuit formation. Another problem is that the size of an impedance matching circuit becomes too large depending on the frequency range of a signal S. Thus, it is difficult to design and manufacture a desired impedance matching circuit.

In this Example 1, impedance matching is made using the above-described control circuit 1 rather than a conventional impedance matching circuit. As shown in FIG. 3B, a signal S is input through an input port 14, transmitted through the input-side signal line 15, and input to the DUT 11.

The control circuit 1 is mainly composed of the cell area 2A, and the feed controller (feed controllers 6) control the amounts of supply power to control the permittivity of the cell area 2A and its neighboring space. The control circuit 1 which is formed in the second layer is located close to the input-side signal line 15 which is in the first layer, and the permittivity as controlled by the control circuit 1 influences the signal S being transmitted through the input-side signal line 15.

The characteristic impedance for the signal S varies being influenced by permittivity. Therefore, the characteristic impedance for the signal S varies when the permittivity as controlled by the control circuit 1 influences the signal S being transmitted through the input-side signal line 15. The characteristic impedance is adjusted by controlling the amount of supply power to the control circuit 1 (feed lines 5).

That is, the feed controller of the control circuit 1 control the amounts of supply power so as to produce such a permittivity value that the characteristic impedance for the signal S becomes a desired value. In particular, a matched characteristic impedance is obtained by controlling the amounts of supply power properly. Impedance matching may be made such that the feed controller control the permittivity so that the impedance of the input-side signal line 15 becomes equal to the characteristic impedance for the signal S being transmitted through the input-side signal line 15.

As a result, impedance matching can be attained on the input side and the power loss of the signal S to be input to the DUT 11 can be controlled intentionally. The same effect can be obtained also by the output-side impedance adjusting circuit 13. Impedance matching can be made on both of the input side and the output side. Thus, a high-quality signal S whose power loss has been controlled intentionally can be output from an output port 17.

As described above, in this Example 1, impedance matching for a signal S is made merely by dynamically varying the amount of power supplied to the cell area 2A without designing and manufacturing an LC circuit or the like. In this manner, impedance matching can be made by a method that is different in concept from the conventional method for designing and manufacturing an impedance matching circuit. That is, impedance matching can be made merely by dynamically controlling the amounts of power supplied from the feed controller.

The control circuit 1 which is formed in the third layer (Layer3) as shown in FIG. 3A operates in the same manner and provides the same advantage as the control circuit 1 formed in the second layer (Layer2). In addition, the control circuit 1 formed in the third layer can provide a function of shielding the printed circuit board from an outside phenomenon occurring on the side of the ground layer GND. The amount of supply power of the control circuit 1 can be controlled so as to produce such a permittivity value that the control circuit 1 exhibits such a shield function. However, this shield function is not indispensable for this Example 1 and the third layer may be omitted.

Although the input-side impedance adjusting circuit 12 has the 4-layer structure, the structure of the input-side impedance adjusting circuit 12 is not limited to it. Although the control circuits 1 are formed in the second layer and the third layer, a control circuit 1 may be formed in the first layer or the fourth layer. Although the input-side signal line 15 and the output-side signal line 16 are formed in the top layer of the control circuit 1, they may be formed in the bottom layer and they may be formed in different layers. Any of the above modifications can provide the same advantage as described above.

Each of the input-side impedance adjusting circuit 12 and the output-side impedance adjusting circuit 13 attains impedance matching for a signal S by controlling the amount of supply power to an optimum value. Although this is a most desirable mode, an adjustment may be made so as to increase the degree of matching to a level that is lower than the level of complete matching. In short, it suffices that the characteristic impedance for a signal S be adjusted to a desired value.

EXAMPLE 2

Figure 4:
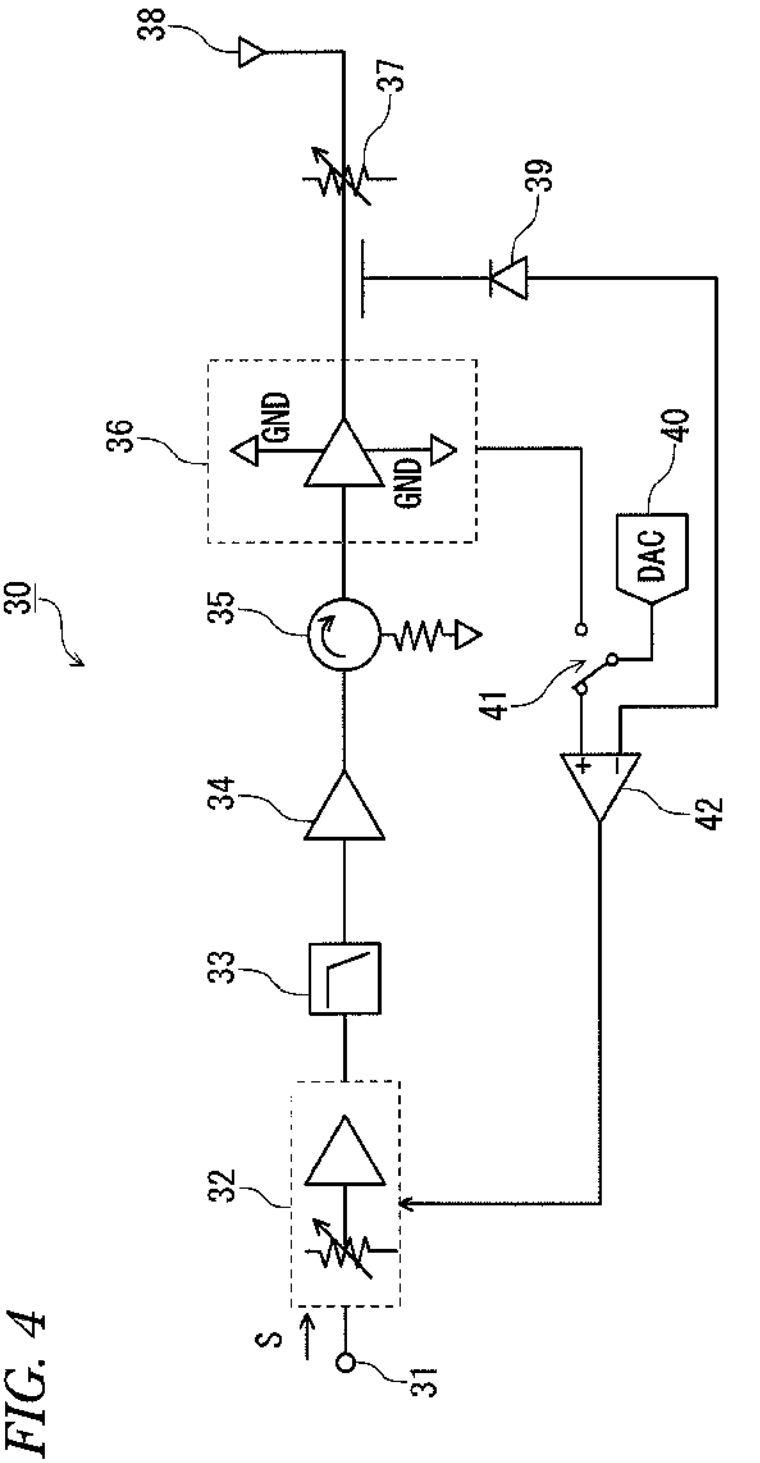
FIG. 4 is a circuit diagram showing an impedance automatic adjusting circuit and a signal level adjusting circuit of Example 2.

Next, a description will be made of Example 2 to which the impedance adjusting circuit of Example 1 is applied. In Example 2, an impedance adjustment is performed automatically. FIG. 4 shows an impedance automatic adjusting circuit 30 of Example 2, which is equipped with an input port 31, an amplifier block 32, a lowpass filter 33, an amplifier 34, an isolator 35, an impedance adjusting circuit 36, a variable attenuator 37, an antenna 38, a detector 39, a DAC 40, a switch 41, and a comparator 42.

A signal S is input through the input port 31. The amplifier block 32 amplifies the signal S. The amplifier block 32 has an external terminal which enables level adjustment (amplification factor adjustment). The lowpass filter 33 eliminates a high-frequency component. The amplifier 34 amplifies the signal S at a prescribed amplification factor. The isolator 35 is an irreversible circuit element which passes the signal S going toward the impedance adjusting circuit 36 while stopping a signal which goes in the opposite direction.

The impedance adjusting circuit 36 is a circuit which is equivalent to the impedance adjusting circuit described in Example 1 (input-side impedance adjusting circuit 12 and/or output-side impedance adjusting circuit 13). The variable attenuator 37 is a circuit which can control the degree of attenuation of the signal S. The antenna 38 transmits the signal S in the form of radio waves.

The detector 39 detects a level (intensity) of the signal S at the output side of the impedance adjusting circuit 36. The level of the signal S is its power, voltage, current, or the like. The DAC (digital-to-analog converter) 40 can output an arbitrary current (or voltage). The DAC 40 serves as a power supply value output unit.

The switch 41 connects the output of the DAC 40 to the impedance adjusting circuit 36 or the comparator 42. When connected to the DAC 40 via the switch 41, the comparator 42 compares a level of the signal S detected by the detector 39 with an output value of the DAC 40 and outputs a comparison result to the external terminal of the amplifier block 32.

Figure 5:
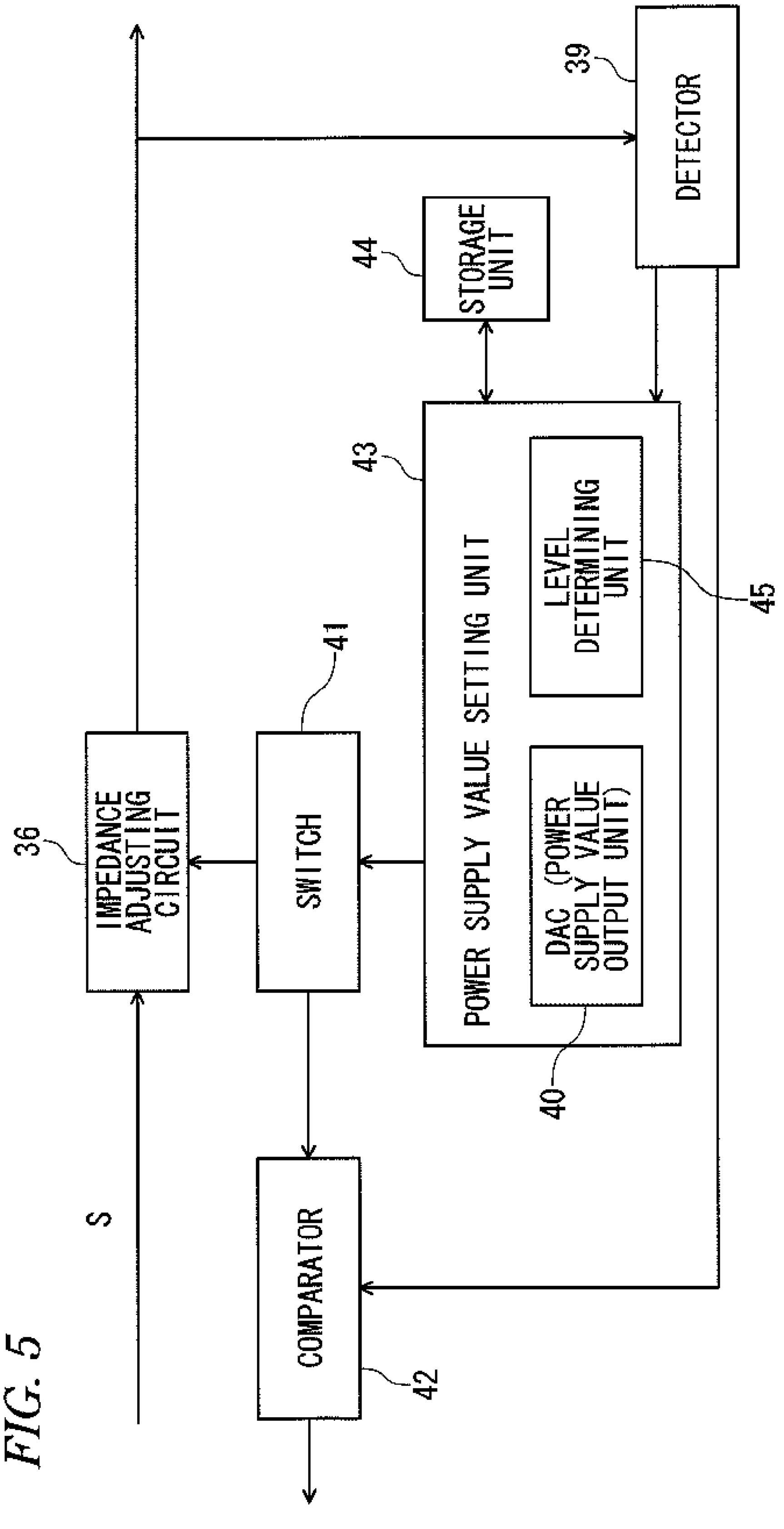
FIG. 5 is a functional block diagram corresponding to part of the circuit of FIG. 4.

FIG. 5 is a functional block diagram corresponding to part of the circuit of FIG. 4. As shown in the block diagram of FIG. 5, a power supply value setting unit 43 has the DAC 40 (power supply value output unit) and a level determining unit 45. A storage unit 44 is connected to the power supply value setting unit 43. The other part of the circuit partly shown in FIG. 5 is the same as the corresponding part of the circuit of FIG. 4. Impedance automatic adjustment and signal level adjustment will be described below in order.

[Impedance Automatic Adjustment]

While the switch 41 is switched to the impedance adjusting circuit 36, the DAC 40 of the power supply value setting unit 43 outputs a power supply value. The impedance adjusting circuit 36 has the control circuit 1 according to the embodiment, and amounts of power of the feed controllers 6 of the control circuit 1 are set.

The DAC 40 of the power supply value setting unit 43 can vary the power supply value (current value) and set arbitrary power supply values in the feed controllers 6. The level determining unit 45 judges a level, detected by the detector 39, of the signal S. Since the level detected by the detector 39 varies according to the amount of supply power, power supply values and detected levels of the signal S are stored in the storage unit 44 such that each of the power supply values is associated with a corresponding one of the detected levels of the signal S.

Next, a description will be made of how the impedance automatic adjusting circuit 30 operates. As shown in FIG. 4, a signal S that is input through the input port 31 passes through the amplifier block 32, whereby its level is adjusted to a prescribed level. A high-frequency component is eliminated from the signal S, whereby the signal S becomes a low-frequency signal. The signal S passes through the isolator 35 and is input to the impedance adjusting circuit 36.

The signal S for which the characteristic impedance has been adjusted by the impedance adjusting circuit 36 is level-detected by the detector 39. The level of the signal S is adjusted by the variable attenuator 37. The level-adjusted signal S is transmitted from the antenna 38 as radio waves.

A level of the output signal of the impedance adjusting circuit 36 is detected by the detector 39. At the beginning, the DAC 40 is connected to the impedance adjusting circuit 36 by the switch 41. A current that is output from the DAC 40 is set in the feed controllers 6 of the impedance adjusting circuit 36. Supply power having the thus-set value is supplied to the feed lines 5 of the respective cells 2. In this manner, the amounts of power supplied to the feed lines 5 of the cells 2, respectively, can be varied. The DAC 40 increases or decreases the output current gradually and causes the amounts of power supplied from the feed controllers 6 to vary accordingly.

As the amounts of supply power are varied, the permittivity of the cell area 2A and its neighboring space is varied, whereby the characteristic impedance for the signal S is varied. Characteristic impedance matching is not made, the level of the signal S detected by the detector 39 becomes low. When the amounts of supply power are varied, the permittivity and hence the characteristic impedance is varied.

The DAC 40 varies the power supply value gradually. In response, the characteristic impedance for the signal S is varied and, resultantly, the level of the signal S detected by the detector 39 is varied. Whereas at first the level of the signal S is detected a low level, the level of the signal S increases as the impedance matching progresses. The detection level of the detector 39 is maximized when the characteristic impedance matching for the signal S is completed. Impedance matching is made and the detection level is maximized also when the impedance of the above-described input-side signal line 15 becomes equal to the characteristic impedance for the signal S being transmitted through the input-side signal line 15.

As described above, the amounts of power supplied from the feed controllers 6 of the impedance adjusting circuit 36 are varied by varying the power supply value that is output from the DAC 40. And the detection level of the detector 39 is varied accordingly. The power supply value setting unit 43 is equipped with the DAC 40 and the level determining unit 45, and stores output current values (power supply values) of the DAC 40 and corresponding detection levels of the detector 39 in the storage unit 44 in pairs. A power supply value corresponding to a maximum detection level of the detector 39 is also stored in the storage unit 44.

In this manner, power supply values and detection levels are stored in the storage unit 44 in pairs. A power supply value corresponding to a desired level of the signal S (detection level) is read from the storage unit 44, and the DAC 40 sets the read-out power supply value in the feed controllers 6 of the impedance adjusting circuit 36.

The feed controllers 6 continue to supply the feed lines 5 with power having the thus-set value, whereby the level of the signal S can be kept at the desired value. In the above-described operation, levels of the signal S that are detected by the detector 39 as the DAC 40 varies the power supply value. And the power supply value setting unit 43 sets, in the feed controllers 6 of the impedance adjusting circuit 36, such a power supply value that the signal S is given a desired level. Therefore, an impedance adjustment can be performed automatically.

When a power supply value that maximizes the detection level of the detector 39 is set in the feed controllers 6, impedance matching is attained automatically and the power loss of the signal S is minimized. However, it is not always necessary to attain complete impedance matching; a control may be made so as to obtain a desired impedance value. In the above-described operation, power supply values and signal levels are stored in the storage unit 44 in pairs and a power supply value corresponding to a desired level is thereafter read out and set. Alternatively, without using the storage unit 44, the power supply value setting unit 43 may set a power supply value at a time point when the level of the signal S detected by the detector 39 has become a desired level.

Although in the above configuration the power supply value output unit is the DAC 40 which varies the power supply value, instead of being the DAC 40 the power supply value output unit may be configured so as to be able to set a power supply value digitally. That is, the power supply value output unit may be such as to set digital data indicating a power supply value in the feed controllers 6 of the impedance adjusting circuit 36.

The power supply value setting unit 43 may be such as to merely issue, to the feed controllers 6 of the impedance adjusting circuit 36, an instruction to vary the amounts of supply power. In response, the feed controllers 6 vary the amounts of supply power. The power supply value setting unit 43 causes the feed controllers 6 to stop varying the amounts of supply power when the level of the signal S detected by the detector 39 has become a desired level, whereby an automatic adjustment can be performed so as to realize a desired impedance value.

With the above operation, the impedance adjusting circuit 36 can realize a desired impedance value. In this operation, it is assumed that a control is performed so as to attain impedance matching. Next, the switch 41 is switched so as to connect the DAC 40 to the comparator 42 (the DAC 40 has been connected to the impedance adjusting circuit 36 so far). As a result, an output value of the DAC 40 and a detection level of the detector 39 are input to the comparator 42.

[Signal Level Adjustment]

After the switching of the switch 41, the DAC 40 outputs a voltage value, a power value, a current value, or the like indicating a detection level. The detection level corresponding to the power supply value that was set in the feed controllers 6 of the impedance adjusting circuit 36 is stored in the storage unit 44 which is connected to the power supply value setting unit 43.

The DAC 40 outputs the above detection level (voltage value, power value, current value, or the like). The detection level that is output from the DAC 40 is input to the comparator 42. The detection level of the detector 39 is also input to the comparator 42. The two detection levels that are input to the comparator 42 are identical. This is because the detector 39 detects a level of the signal S that is determined by the power supply value that was set by the power supply value setting unit 43 and the DAC 40 outputs the detection level corresponding to the power supply value.

Therefore, basically, the result of the comparison between the two detection levels by the comparator 42 should be "identical." This comparison result is maintained as long as the level of the signal S is stable. However, the comparison result of the comparator 42 becomes "not identical" if the level of the signal S varies due to, for example, a certain disturbance (e.g., if the level of the signal S lowers when the gain of each circuit decreases due to a temperature variation).

In view of the above, the comparator 42 performs a level adjustment on the signal S using the amplifier block 32. This makes it possible to always transmit the signal S at a constant level from the antenna 38 even if a level variation has occurred in the signal S. For example, when the level of the signal S detected by the detector 39 has lowered (or risen) due to, for example, a disturbance, the comparator 42 performs a level adjustment so that the level of the signal S is always kept constant by increasing (or decreasing) the amplification factor of the amplifier block 32. Thus, an AGC (automatic gain control) function is realized by the operation that the comparator 42 controls the amplifier block 32 based on the level of the signal S detected by the detector 39. This makes it possible to always output the signal S at a constant level.

The circuit which performs the above AGC is a signal level adjusting circuit which can keep the level of the signal S stable. The comparator 32 and the amplifier block 32 serves as its controller.

As described above, in this Example 2, a control is made so that the level of the signal S detected by the detector 39 becomes a desired level by changing the amount of supply power of the impedance adjusting circuit 36. The impedance adjustment can be performed automatically because the amount of supply power is set by changing the output current of the power supply value output unit automatically.

EXAMPLE 3

Example 3 is an application example of the control circuit 1 according to the embodiment. The control circuit 1 used in Example 3 acts on a radio signal by controlling the permittivity. More specifically, the control circuit 1 is given such a characteristic as to transmit a radio signal having a particular frequency and reflect radio signals having other frequencies. Radio transceiver circuits 50 and 60 are constructed using the control circuit 1 having such a characteristic.

Figure 6:
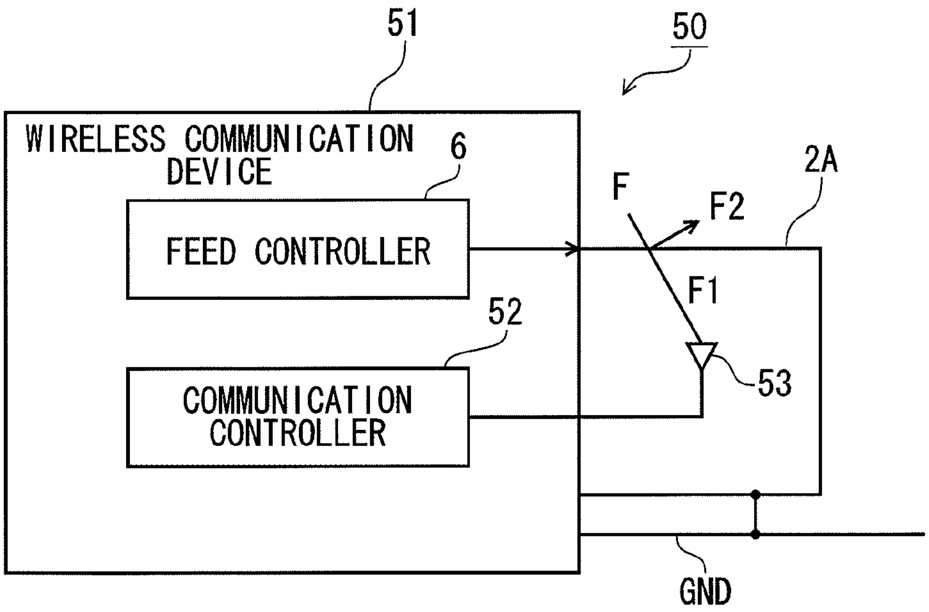
FIG. 6 shows an example radio transceiver circuit of Example 3.

FIG. 6 shows an example radio transceiver circuit 50, which is equipped with a wireless communication device 51 and a control circuit 1. The control circuit 1 is composed of a cell area 2A and feed controllers 6 which was described in the embodiment. The wireless communication device 51 is composed of the feed controllers 6, a communication controller 52, and an antenna 53.

The cell area 2A is disposed around the antenna 53 so as to cover it. Thus, the wireless communication device 51 and the cell area 2A form a closed space. The antenna 53 is disposed inside the closed space. The wireless communication device 51 is a device which is connected to the antenna 53 and controls transmission and reception of a radio signal. The antenna 53 transmits and receives a radio signal. The antenna 53 may be such as to perform only one of transmission and reception of a radio signal.

In the control circuit 1, the permittivity is controlled by controlling the amounts of power supplied to the feed lines 5 of the respective cells 2 which constitute the cell area 2A, whereby the refractive indices of the respective cells 2 are varied. The refractive index variations influence a radio signal and thereby enable its transmission or reflection. Thus, the control circuit 1 can be given such a characteristic as to transmit a radio signal having a particular frequency and reflect radio signals having other frequencies. For example, the control circuit 1 can be given such a characteristic as to transmit a radio signal of a 2-GHz band and reflect radio signals of other frequency bands.

The feed controllers 6 controls the amount of supply power so that the cell area 2A and its neighboring space have the above characteristic. The cell area 2A which is disposed around the antenna 53 transmits a radio signal F1 having a particular frequency among radio signals F having various frequencies and reflects radio signals F2 having the other frequencies.

The radio transceiver circuit 50 performs a wireless communication by transmitting and receiving radio signals F1 having the particular frequency. On the other hand, radio signals F2 having other frequencies become noise components and hence it is desirable to prevent the antenna 53 from receiving such radio signals F2. Since it is possible to allow the antenna to transmit and receive only radio signals F1 having the particular frequency, a high-quality wireless communication can be realized. It suffices that the transmittable and receivable frequency band of the antenna 53 at least include the particular frequency. For example, even an antenna 53 which can transmit and receive not only a radio signal having the particular frequency but also radio signals of other frequency bands is made usable by employing a transmission and reception characteristics which is attained by the above-described permittivity control. That is, the frequency band of the antenna 53 is not limited to the particular frequency and a wide-band antenna can be used as the antenna 53. Although in this Example 3 the antenna 53 is fully covered with the cell area 2A to form a closed space, the antenna 53 may be covered partially with the cell area 2A.

Figure 7:
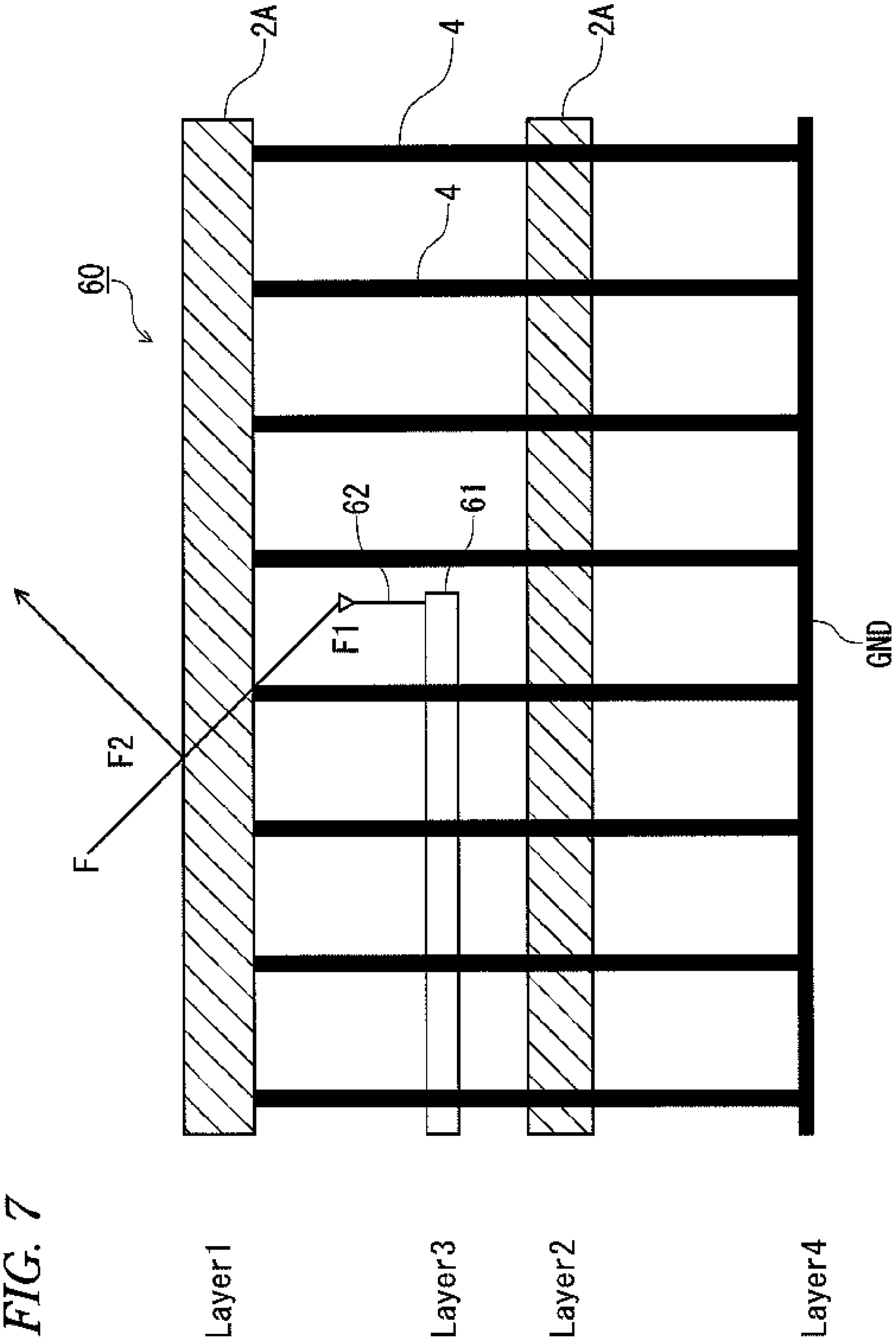
FIG. 7 shows another example radio transceiver circuit of Example 3.

As shown in FIG. 7, it is possible to form a multi-layered radio transceiver circuit 60. As shown in FIG. 7, the radio transceiver circuit 60 uses cell areas 2A in the first layer (Layer1) and the second layer (Layer2), respectively. A third layer (Layer3) is an intermediate layer which is interposed between the first layer and the second layer. A substrate 61 and an antenna 62 are provided in the third layer. A fourth layer (Layer4) is the ground layer GND which was described in Example 1.

As described above, by controlling the amounts of supply power, each of the cell areas 2A formed in the first layer and the second layer can be given such a characteristic as to transmit a radio signal F1 having a particular frequency among radio signals F having various frequencies and reflect radio signals F2 having the other frequencies.

The permittivity values are controlled so that the cell areas 2A formed in the first layer and the second layer have the same characteristic. The substrate 61 and the antenna 62 are provided in the third layer, that is, between the first layer and the second layer. A radio signal F1 having the particular frequency passes through the cell areas 2A and is received by the antenna 62, or a radio signal F1 having the particular frequency that is emitted from the antenna 62 passes through the cell areas 2A and is transmitted. On the other hand, radio signals F2 having other frequencies are reflected by the cell areas 2A and are not received by the antenna 62.

In this manner, only a radio signal F1 having the particular frequency can be transmitted and received by the antenna 62 whereas radio signals F2 having other frequencies are reflected as noise components and not received by the antenna 62. As a result, high-quality wireless communication can be realized.

Although in the above Example 3 both of the cell areas 2A formed in the first layer and the second layer are given such a characteristic as to transmit only a radio signal F1 having a particular frequency and reflect radio signals F2 having other frequencies, the permittivity values may be controlled so that one of the cell areas 2A formed in the first layer and the second layer is given such a characteristic as to interrupt radio signals F of all frequencies.

Even in this case, only the radio signal F1 having the particular frequency is received by the antenna 62 whereas the radio signals F2 having other frequencies that will become noise components are not received by the antenna 62. Therefore, a good wireless communication is enabled by interposing, between the first layer and the second layer, the third layer which is provided with the antenna 62.

EXAMPLE 4

Figure 8:
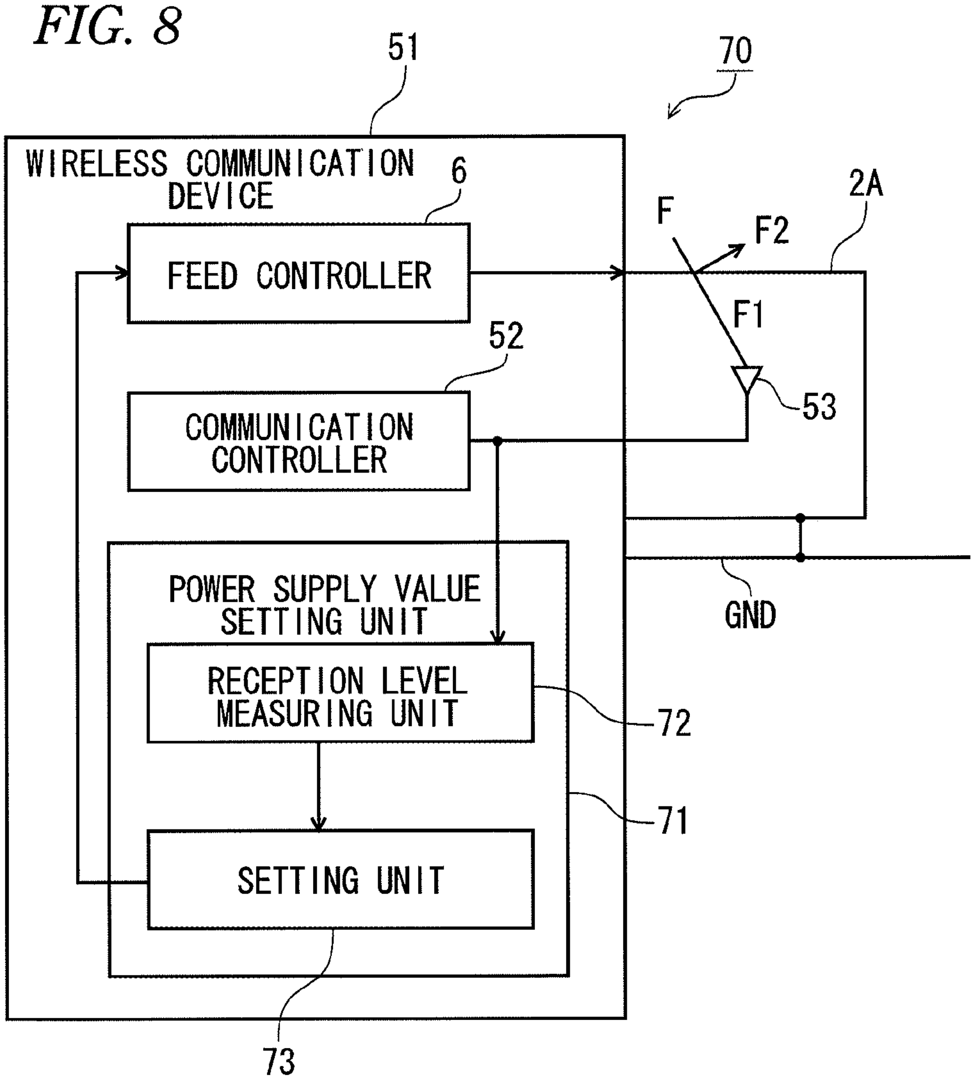
FIG. 8 shows a radio transmission/reception automatic adjusting circuit of Example 4.

Example 4 is an application example of the radio transceiver circuit 50 of Example 3. FIG. 8 shows a radio transmission/reception automatic adjusting circuit 70 of Example 4. The radio transmission/reception automatic adjusting circuit 70 is configured such that a power supply value setting unit 71 is added to the radio transceiver circuit 50 of FIG. 6. The power supply value setting unit 71 is equipped with a reception level measuring unit 72 and a setting unit 73.

The reception level measuring unit 72 measures a level of a radio signal F1 having a desired frequency that is received by the antenna 53. As described above, by controlling the amounts of power supplied from the feed controllers 6, the control circuit 1 can be given such a characteristic as to allow a radio signal F1 having a desired frequency to reach the antenna 53 and to reflect radio signals F2 having other frequencies.

However, if the amounts of supply power are not appropriate, such a characteristic cannot be obtained. In view of this, the reception level measuring unit 72 measures a reception level of the radio signal F1 and outputs a measurement value to the setting unit 73. If the reception level of the radio signal F1 having the desired frequency is low, the setting unit 73 causes the feed controllers 6 to change the amounts of supply power.

Figure 9:
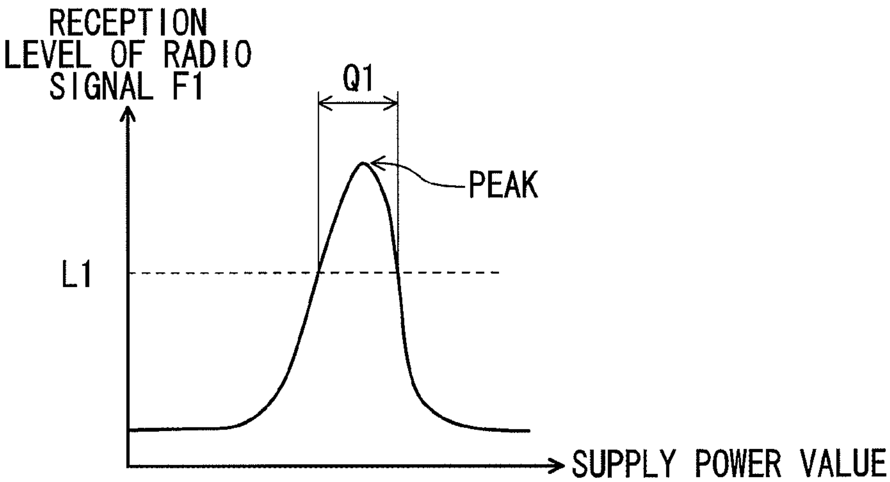
FIG. 9 is a graph showing a relationship between the reception level of a radio signal and the amount of supply power.

When the amounts of supply power are changed, the permittivity of the control circuit 1 and its neighboring space is varied. As a result, the transmittance of the radio signal F1 having the desired frequency and the reflectance of the radio signals F2 having other frequencies are varied. FIG. 9 is a graph showing an example relationship between the reception level of the radio signal F1 and the amount of supply power.

As seen from the graph of FIG. 9, as the amount of supply power is increased, the reception level of the radio signal F1 increases and then decreases after reaching the peak. Thus, the graph is shaped like a Gaussian curve. Therefore, measuring the reception level by the reception level measuring unit 72 while the feed controllers 6 varies the amounts of supply power makes it possible to realize a characteristic of passing only the radio signal F1 and reflecting other radio signals F2.

If the amount of supply power is set to a value corresponding to the peak shown in FIG. 9, the reception level of the radio signal F1 is maximized, in which state a wireless communication can be performed with highest quality. It is therefore desirable that the amount of supply power be set to such a value as to maximize the reception level of the radio signal F1. However, as shown in FIG. 9, a wireless communication can still be performed even if the reception level of the radio signal F1 is not at the peak value.

In FIG. 9, a horizontal broken line L1 indicates a lower limit of a reception level range in which the radio signal F1 can be received. Since the radio signal F1 can be received when the reception level is higher than or equal to L1, a supply power range Q1 in which the reception level is higher than or equal to L1 is a receivable supply power range. The radio signal F1 can be received if setting and a control are made so that the amount of power supply is set in the range Q1. That is, it is not always necessary to attain a maximum reception level; the reception level may be set in a certain range.

To set the reception level to a maximum level, the reception level measuring unit 72 measures reception levels as the amount of supply power is varied (increased or decreased gradually). If a reception level measured with a current amount of supply power that is set by the setting unit 73 is higher than a reception level obtained before a change of the amount of supply power (obtained with the preceding setting), the amount of power supply is changed further to produce the next setting. On the other hand, if the reception level measured with the current amount of supply power is lower than the reception level obtained before the change of the amount of supply power (obtained with the preceding setting), the latter reception level is judged a maximum reception level.

That is, the amounts of power supplied from the feed controllers 6 are varied, and a power supply value that is immediately before a power supply value with which the reception level measured by the reception level measuring unit 72 has decreased for the first time is set in the feed controllers 6. The reception level of the radio signal F1 can be kept at the maximum level by maintaining this setting.

EXAMPLE 5

Figure 10:
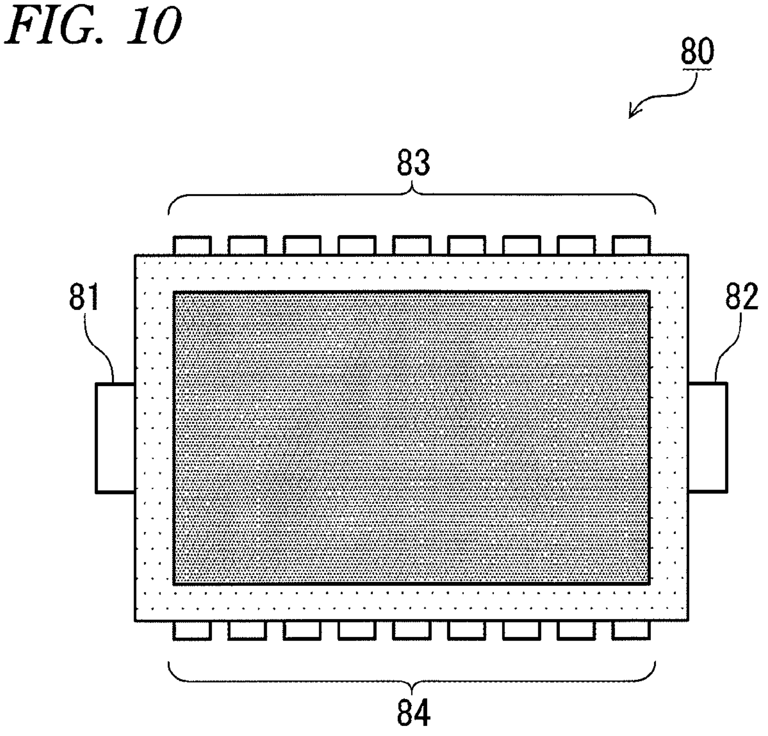
FIG. 10 shows a chip of Example 5.

Example 5 is directed to applications of the embodiment and Examples 1-4. The above-described various circuits can be implemented as one chip using a substrate having a relatively large permittivity value (the permittivity may be low). FIG. 10 shows a chip 80 of Example 5, which is a one-chip version of the impedance automatic adjusting circuit 30 of Example 2.

It goes without saying that each of the control circuit 1 according to the embodiment, the signal input/output circuit 10 of Example 1, the level adjusting circuit of Example 2, the radio transceiver circuit 50 of Example 3, and the radio transmission/reception automatic adjusting circuit 70 of Example 4 may be implemented as one chip. Only part of each of these circuits may be implemented as one chip instead of its entirety.

The chip 80 shown in FIG. 10 is equipped with an input port 82, an output port 82, first control ports 83, and second control ports 84. The input port 82 is a port for input of a signal S. An impedance adjustment for the signal S is performed automatically in the chip 80. The signal S is output from the output port after being processing by a non-linear element such as the DUT 11.

As described above, the feed controllers 6 are provided as the feed controller for controlling the amounts of power supplied to the feed lines 5 of the respective cells 2. The feed controllers 6 are current sources and can be implemented as ports (power supply ports) provided in the first control ports 83 and the second control ports 84.

Furthermore, a terminal for switching of the switch 41 and the terminal for control of the DAC 40 (see FIG. 4) may be implemented as ports provided in the first control ports 83 and the second control ports 84. Implementing the impedance automatic adjusting circuit 30 of Example 2 as one chip in the above-described manner makes it possible to reduce the circuit scale.

Where the chip 80 incorporates a CPU, an ALC (automatic level control) device, a variable attenuator, a VCO (voltage-controlled oscillator), a PLL (phase-locked loop), a power divider/combiner, an antenna, or the like, a port(s) for control of the incorporated device is provided in the first control ports 83 and the second control ports 84.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. A control circuit comprising:

a cell area comprising a plurality of cells arranged therein, each of the cells comprising:

a first conductor having at least one capacitance component;

a second conductor connected to the first conductor and having an inductance component; and a feed line provided to be in non-contact with the first conductor and the second conductor, wherein a size of each of the cells is smaller than a wavelength of a signal to be influenced by the cells; and at least one feed controller configured to control at least one of permittivity and permeability of the cell area by changing the amount of a power supply provided to the feed line of each of the cells.

2. The control circuit of claim 1, wherein the second conductor is formed as a via conductor which is short-circuited to a common potential for the respective cells, and the feed line is in non-contact with the via conductor.

3. The control circuit of claim 1 or 2, wherein the first conductor is formed in an approximately 8-shape having at least one air gap.

4. An impedance adjusting circuit comprising:

the control circuit of claim 1 or 2; and a signal line which is in non-contact with the cell area, wherein the control circuit is configured to control the permittivity of the cell area so as to obtain a desired characteristic impedance of a signal transmitted through the signal line.

5. An impedance automatic adjusting circuit comprising:

the impedance adjusting circuit of claim 4;

a detector configured to detect, for different power supply values, a level of the signal that is output from the impedance adjusting circuit; and a power supply value setting unit configured to set a power supply value corresponding to a desired level of the signal in the feed controller.

6. The impedance automatic adjusting circuit of claim 5, further comprising:

a storage unit configured to store power supply values and levels of the signal detected by the detector such that each of the power supply values is associated with a corresponding one of the levels of the signal, wherein the power supply value setting unit is configured to set, in the feed controller, the power supply value corresponding to the desired level of the signal, which is stored in the storage unit.

7. The impedance automatic adjusting circuit of claim 5 or 6, further comprising:

a level controller configured to control the power supply value such that the level of the signal detected by the detector is coincident with the level of the signal corresponding to the power supply value set by the power supply value setting unit.

8. A radio transceiver circuit comprising:

the control circuit of claim 1 or 2; and an antenna configured to transmit and receive a radio signal having a certain frequency, wherein the cell area of the control circuit is provided around the antenna, and wherein the feed controller controls the permittivity of the cell area such that the radio signal having the certain frequency is allowed to pass through the cell area and radio signals having frequencies other than the certain frequency are reflected by the cell area.

9. The radio transceiver circuit of claim 8, wherein the control circuit comprises first and second control circuits, and a cell area of the first control circuit is formed on a first layer, a cell area of the second control circuit is formed on a second layer, and the antenna is formed on a third layer which is located between the first and second layers.

10. The radio transceiver circuit of claim 8, further comprising:

a power supply value setting unit configured to measure a reception level of the radio signal having the certain frequency, which is received by the antenna, and to set a power supply value corresponding to the measured reception level of the radio signal in the feed controller.

11. The radio transceiver circuit of claim 10, wherein if a first power supply value corresponding to a first reception level of the radio signal having the certain frequency is set in the feed controller in advance, the power supply value setting unit:

i) measure a second reception level of the radio signal having the certain frequency, which corresponds to a second power supply value, wherein the second power supply value is larger than the first power supply value;

ii) set the second power supply value in the feed controller, if the second reception level corresponding to the second power supply value is larger than the first reception level corresponding to the first power supply value; and iii) set the first power supply value in the feed controller, if the second reception level corresponding to the second power supply value is smaller than the first reception level corresponding to the first power supply value.

12. The control circuit of claim 1, wherein the control circuit is integrated in one chip.

13. A control method of controlling at least one of permittivity and permeability of a cell area comprising a plurality of cells arranged therein, each of the cells comprising: a first conductor having at least one capacitance component, a second conductor connected to the first conductor and having an inductance component; and a feed line provided to be in non-contact with the first conductor and the second conductor, wherein a size of each of the cells is smaller than a wavelength of a signal to be influenced by the cells, the control method comprising:

controlling at least one of permittivity and permeability of the cell area by changing the amount of a power supply provided to the feed line of each of the cells.

14. An impedance adjusting method using the control method of claim 13, comprising:

controlling the permittivity of the cell area so as to obtain a desired characteristic impedance of a signal transmitted through a signal line which is in non-contact with the cell area.

15. An impedance automatic adjusting method using the impedance adjusting method of claim 14, comprising:

detecting a level of the signal for different power supply values; and setting a power supply value corresponding to a desired level of the signal, when the detected level of the signal reaches the desired level.

16. The impedance automatic adjusting method of claim 15, further comprising:

controlling the power supply value such that the detected level of the signal is coincident with the level of the signal corresponding to the set power supply value.

17. A radio transceiving method of transceiving a radio signal having a certain frequency with an antenna by using the control method of claim 13, wherein the antenna is configured to transmit and receive a radio signal having a certain frequency, and the cell area is provided around the antenna, the method comprising:

controlling the permittivity of the cell area such that the radio signal having the certain frequency is allowed to pass through the cell area and radio signals having frequencies other than the certain frequency are reflected by the cell area; and transceiving the radio signal having the certain frequency with the antenna.

18. The radio transceiving method of claim 17, further comprising:

measuring a reception level of the radio signal having the certain frequency, which is received by the antenna; and setting a power supply value corresponding to the measured reception level.

* * * * *